(12) United States Patent
Tani (10) Patent No.: US 6,564,017 B2
(45) Date of Patent: May 13, 2003

(54) MECHANISM FOR ADJUSTING AN ANGLE OF A MIRROR INCORPORATED IN AN OPTICAL DEVICE, AND A PARALLAX CORRECTING MECHANISM OF A CAMERA

(75) Inventor: Tetsuro Tani, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/887,323

(22) Filed: Jun. 25, 2001

(65) Prior Publication Data
US 2001/0055485 A1 Dec. 27, 2001

(30) Foreign Application Priority Data
Jun. 26, 2000 (JP) .......................... 2000-190959

(51) Int. Cl.$^7$ ........................... G03B 13/14; G03B 13/08
(52) U.S. Cl. ........................................ 396/377; 396/385
(58) Field of Search ............................. 396/373, 377, 396/383, 385, 378, 386

(56) References Cited

U.S. PATENT DOCUMENTS

| | | | |
|---|---|---|---|
| 4,969,723 A | * 11/1990 | Kato et al. | ................... 359/429 |
| 5,345,287 A | 9/1994 | Taguchi | ....................... 396/378 |
| 5,390,051 A | 2/1995 | Saito et al. | ................... 359/872 |
| 5,452,034 A | 9/1995 | Ichikawa et al. | ............ 396/377 |
| 5,563,671 A | 10/1996 | Inazuka | ....................... 396/377 |

* cited by examiner

Primary Examiner—Christopher Mahoney
(74) Attorney, Agent, or Firm—Greenblum & Bernstein, P.L.C.

(57) ABSTRACT

A parallax correcting mechanism of a camera includes a mirror; a mirror frame supporting the mirror; a pair of pivotal-point projections formed on a viewfinder body to lie on a mirror rotational axis of the mirror; a pair of recesses formed on the mirror frame or the viewfinder body; a pair of projections formed on the mirror frame or the viewfinder body to be engaged in the pair of recesses; a leaf spring for pressing the mirror frame against the pair of pivotal-point projections; and an adjusting screw which is screwed into the viewfinder body on one side of the mirror frame with respect to the mirror rotational axis. A flat face of a head of the adjusting screw contacts an end portion of the one side of the mirror frame.

8 Claims, 9 Drawing Sheets

MECHANISM FOR ADJUSTING AN ANGLE OF A MIRROR INCORPORATED IN AN OPTICAL DEVICE, AND A PARALLAX CORRECTING MECHANISM OF A CAMERA

BACKGROUND OF THE INVENTION

1. Field of the Invention

The present invention relates to a mechanism for adjusting an angle of a mirror incorporated in an optical device. The present invention also relates to a mechanism of a camera for correcting a parallax which occurs between the photographing optical system and the viewfinder optical system which are provided independent of each other within the camera.

2. Description of the Related Art

Various types of parallax correcting mechanisms which are incorporated in a camera having a photographing optical system and a viewfinder optical system that are provided independent of each other are known in the art. For instance, in a conventional compact camera having a real-image type viewfinder which is provided with a parallax adjusting mechanism, a parallax is corrected by adjusting an angle of a mirror which is provided in a viewfinder optical system as an optical element thereof between the eyepiece optical system and the objective optical system. The herein described parallax correction refers to the adjustment of inclination of the optical axis of the finder optical system with respect to the optical axis of the photographing optical system, and does not refer to correction of the difference in the field-of-view area. In such a conventional parallax correcting mechanism, although it is preferable that an axis of rotation of the mirror be positioned on the reflection surface of the mirror and that the axis of rotation of the mirror be positioned at substantially the same level as an axis of the viewfinder optical system which extends from the reflection surface of the mirror, the parallax correcting mechanism becomes complicated if such arrangements are achieved. Moreover, in a conventional parallax correcting mechanism, the angle of the mirror easily moves out of adjustment with time.

SUMMARY OF THE INVENTION

An object of the present invention is to provide a simple mechanism for adjusting an angle of a mirror incorporated in an optical device, wherein the angle of the mirror does not easily move out of adjustment with time. Another object of the present invention is to provide a simple mechanism of a camera for correcting a parallax which occurs between the photographing optical system and the viewfinder optical system that are provided independent of each other in the camera, wherein the parallax adjustment does not easily move out of adjustment with time.

To achieve the objects mentioned above, according to an aspect of the present invention, a parallax correcting mechanism of a camera for correcting a parallax between a photographing optical system and a viewfinder optical system which are provided independent of each other within the camera, the parallax correcting mechanism including a mirror which serves as an element of the viewfinder optical system; a mirror frame which supports the mirror; a pair of pivotal-point projections formed on a viewfinder body to lie on a mirror rotational axis of the mirror, each of the pair of pivotal-point projections contacting a portion of a reflection surface of the mirror which is positioned outside an effective area of the reflection surface; a pair of recesses formed on one of the mirror frame and the viewfinder body; a pair of projections formed on the other of the mirror frame and the viewfinder body to be respectively engaged in the pair of recesses, the pair of projections and the pair of recesses being positioned on the opposite side of the reflection surface of the mirror with respect to the pair of pivotal-point projections; a leaf spring for pressing the mirror frame against the pair of pivotal-point projections; and an adjusting screw which is screwed into the viewfinder body on one side of the mirror frame with respect to the mirror rotational axis. A flat face of a head of the adjusting screw, which is positioned on the thread side of the adjusting screw, contacts an end portion of the one side of the mirror frame.

Preferably, the leaf spring is positioned between the mirror frame and the viewfinder body.

The viewfinder optical system includes an erecting optical system, the mirror serving as an element of the erecting optical system.

Preferably, the mirror frame includes a hole in which an adhesive is poured to adhere the mirror to the mirror frame.

In an embodiment, the viewfinder optical system is a real-image viewfinder optical system.

According to another aspect of the present invention, a mirror-angle adjusting mechanism is provided, for adjusting an angle of a mirror incorporated in an optical device, the mirror-angle adjusting mechanism including a mirror frame which supports the mirror; a pair of pivotal-point projections formed on a body of the optical device to lie on a mirror rotational axis of the mirror, each of the pair of pivotal-point projections contacting a portion of a reflection surface of the mirror which is positioned outside an effective area of the reflection surface; a pair of recesses formed on one of the mirror frame and the body; a pair of projections formed on the other of the mirror frame and the body to be respectively engaged in the pair of recesses, the pair of projections and the pair of recesses being positioned on the opposite side of the reflection surface of the mirror with respect to the pair of pivotal-point projections; a leaf spring for pressing the mirror frame against the pair of pivotal-point projections; and an adjusting screw which is screwed into the body on one side of the mirror frame with respect to the mirror rotational axis. A flat face of a head of the adjusting screw, which is positioned on the thread side of the adjusting screw, contacts an end portion of the one side of the mirror frame.

Preferably, the leaf spring is positioned between the mirror frame and the body.

Preferably, the mirror frame includes a hole in which an adhesive is poured to adhere the mirror to the mirror frame.

The present disclosure relates to subject matter contained in Japanese Patent Application No.2000-190959 (filed on Jun. 26, 2000) is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
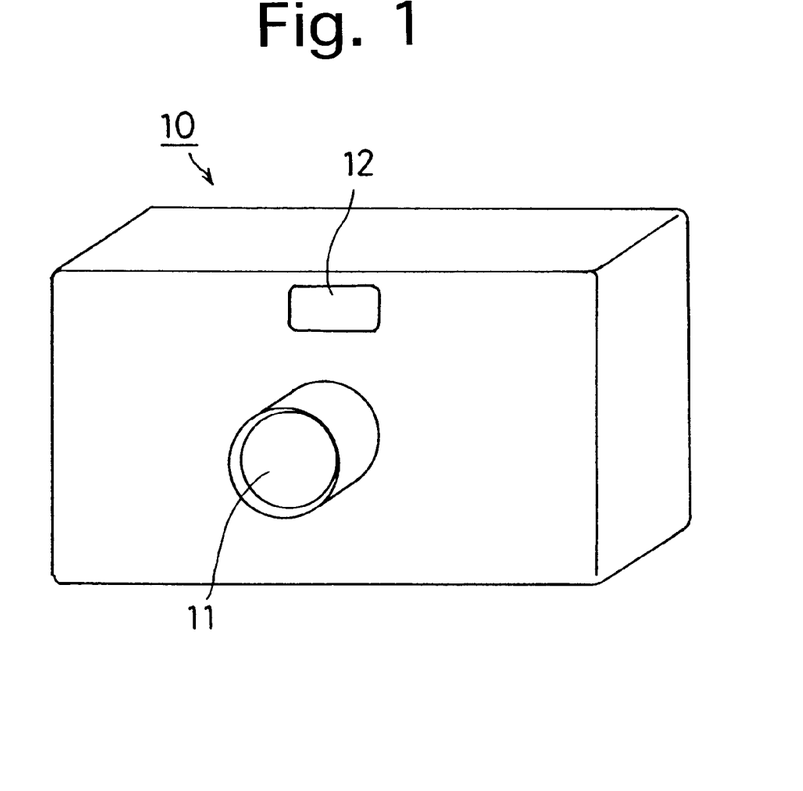
FIG. 1 is a perspective view of a camera having an embodiment of a parallax correcting mechanism according to the present invention.
Figure 2:
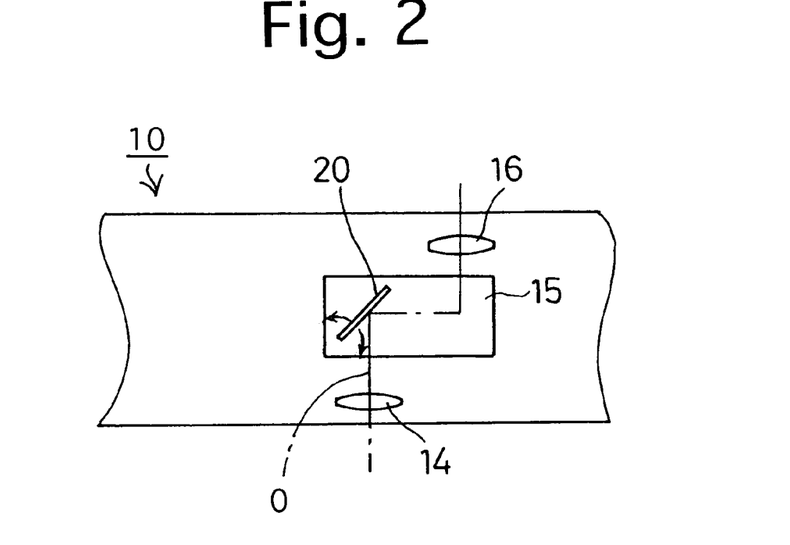
FIG. 2 is a conceptual diagram of a viewfinder optical system of the camera shown in FIG. 1.

FIG. 1 shows a camera 10 having a parallax correcting mechanism according to an embodiment of the present invention. The camera 10 is provided with a photographing optical system 11 and a viewfinder optical system 12 which is independent of the photographing optical system 11. The viewfinder optical system 12 is positioned above the photographing optical system 11. The viewfinder optical system 12 is a real-image type, and includes an objective optical system 14, an erecting optical system 15 and an eyepiece optical system 16, in that order from the object side (see FIG. 2). An inverted image (real image) formed via the objective optical system 14 is converted into an erect image via the erecting optical system 15 to be viewed through the eyepiece optical system 16. The erecting optical system 15 includes four reflection surfaces. A rectangular mirror 20 shown in FIGS. 2 and 3 serves as one of the four reflection surfaces of the erecting optical system 15. A parallax which occurs between the photographing optical system 11 and the viewfinder optical system 12 is corrected by adjusting the angle of the mirror 20. Such a manner of correcting the parallax is known in the art.

Figure 3:
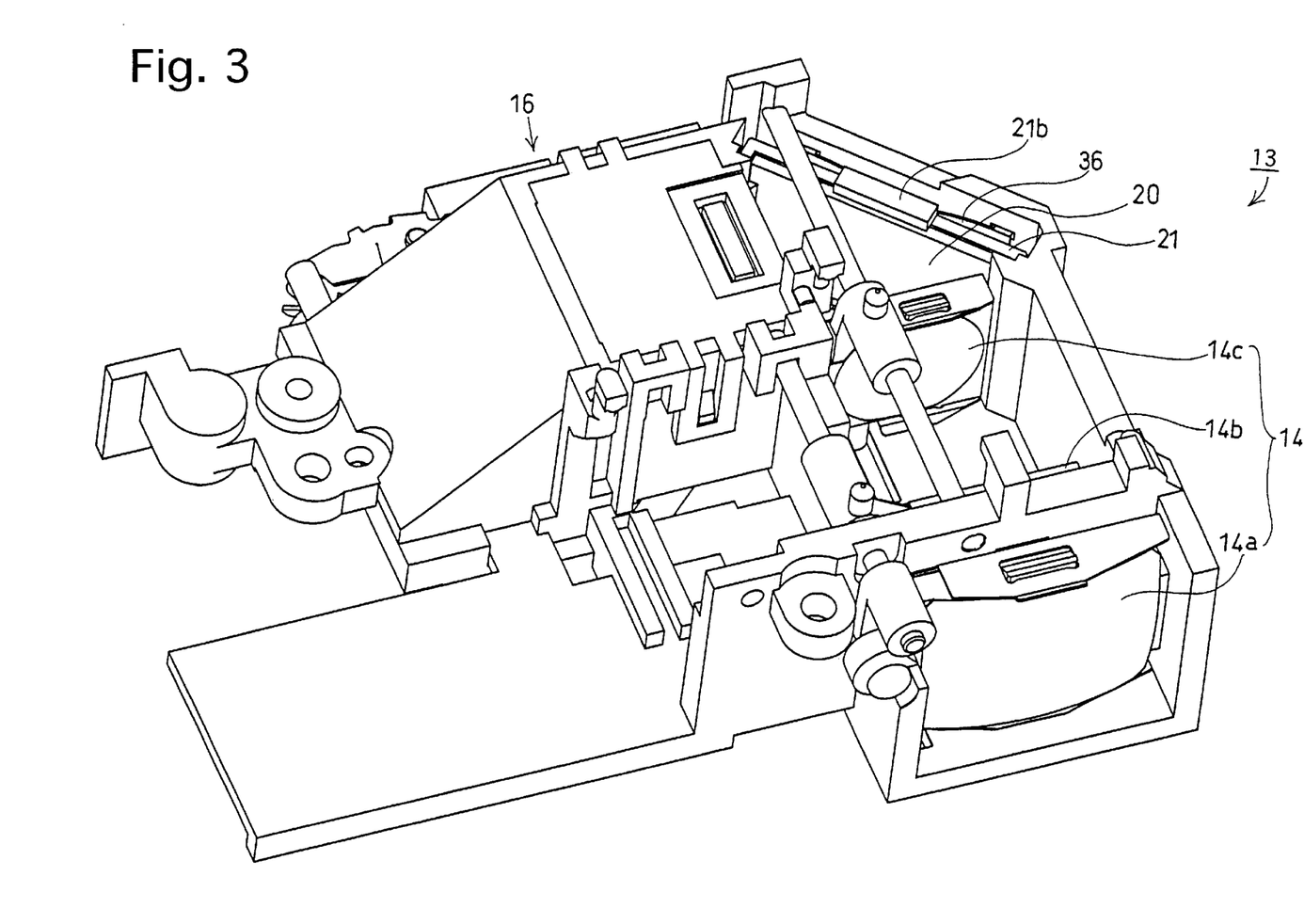
FIG. 3 is a perspective view of a viewfinder body which accommodates the viewfinder optical system shown in FIG. 2, viewed from the objective optical system thereof.

The camera 10 is provided therein with a viewfinder body 13 which carries the viewfinder optical system 12 (see FIG. 3). The viewfinder body 13 accommodates the objective optical system 14, the erecting optical system 15 and the eyepiece optical system 16. The objective optical system 14 includes three lens groups: first, second and third lens groups 14a, 14b and 14c. The viewfinder optical system 12 is a zoom viewfinder optical system. The second lens group 14b and the third lens group 14c are movable lens groups which are driven in a direction of an optical axis of the objective optical system 14 to perform a zooming operation, i.e., to continuously vary the focal length of the viewfinder optical system 12 without disturbing focus. The first lens group 14a is stationary during the zooming operation.

Figure 6:
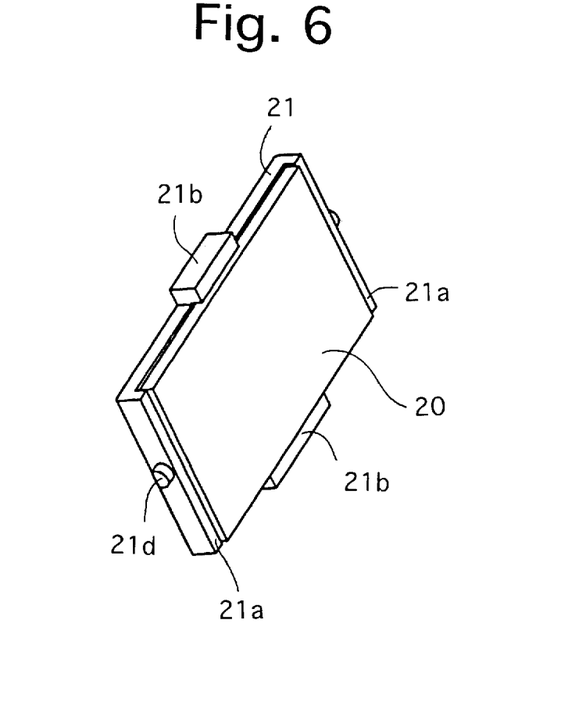
FIG. 6 is a perspective view of the mirror frame and a mirror adhered to the mirror frame.
Figure 7:
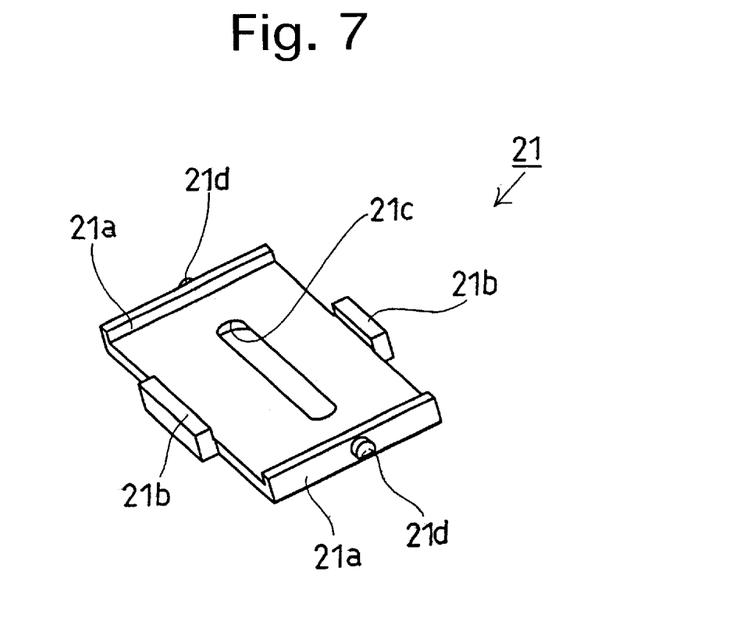
FIG. 7 is a perspective view of the mirror frame.

As shown in FIG. 6, the mirror 20 of the erecting optical system 15 is fixed to a generally-rectangular shaped mirror frame 21. As shown in FIG. 7, the mirror frame 21 is provided on a flat major portion thereof with an elongated hole 21c, and is further provided, on the outer edge of the flat major portion around the elongated hole 21c, with four positioning protrusions 21a and 21b. When the mirror 20 is fixed to the mirror frame 21, the mirror 20 is placed on the flat major portion of the mirror frame 21 with four side edges of the mirror 20 contacting the four positioning protrusions 21a and 21b, respectively, and subsequently an adhesive is poured into the elongated hole 21c. The mirror frame 21 is provided on opposite sides thereof with a pair of projections (coaxial projections) 21d which lie on a horizontal plane including an optical axis O (see FIG. 2) of the viewfinder optical system 12.

Figure 5:
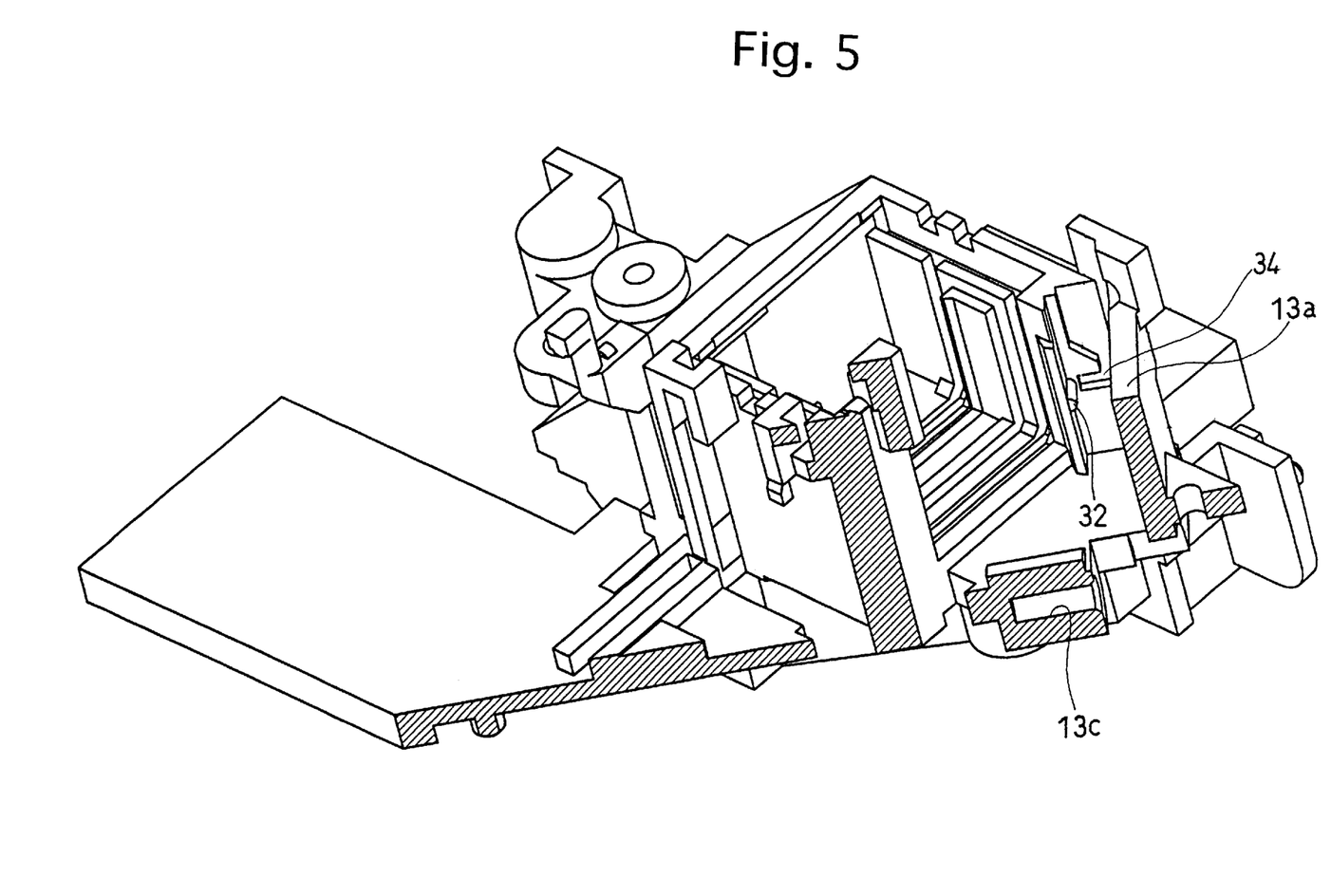
FIG. 5 is a perspective view, partly in cross section, of the viewfinder body shown in FIGS. 3 and 4 in a state where a mirror frame, a leaf spring and an adjusting screw are removed from the viewfinder body, the cross section being taken along V—V line shown in FIG. 4.
Figure 10:
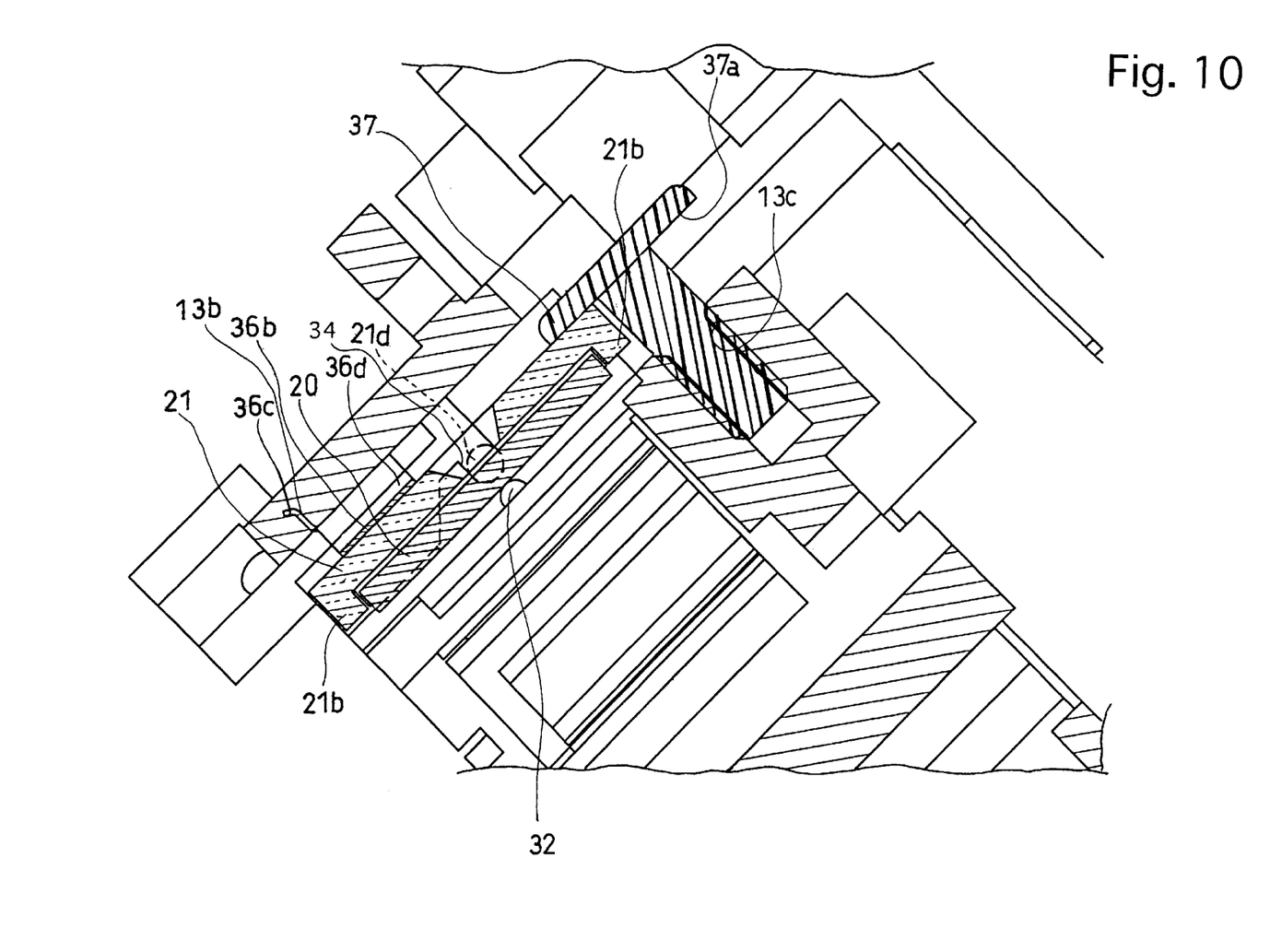
FIG. 10 is a cross sectional view of a portion of the viewfinder body, taken along the V—V line shown in FIG. 4, viewed in the direction of the appended arrows.
Figure 11:
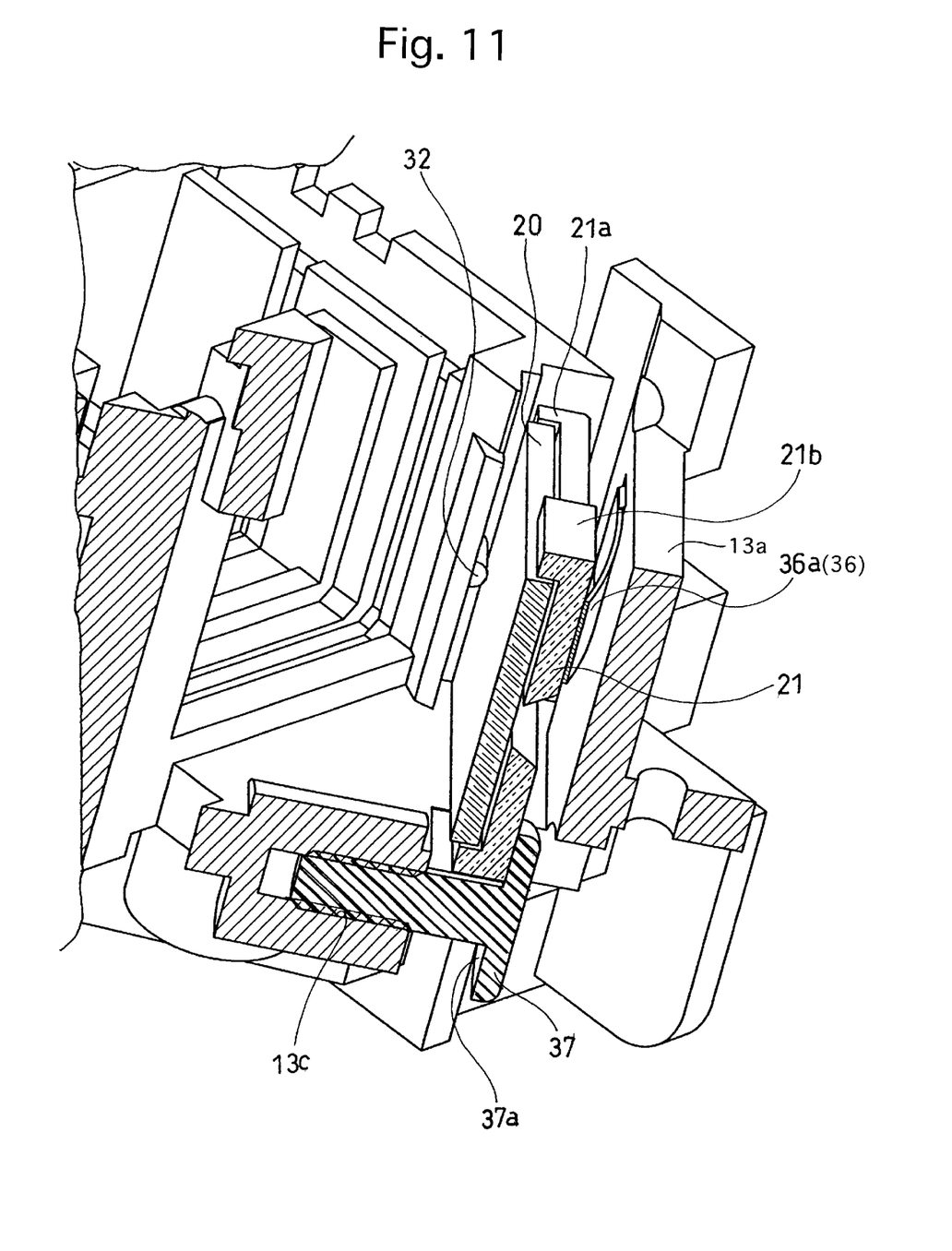
FIG. 11 is a view similar to that of FIG. 5 and illustrates a portion of the viewfinder body in a state where the mirror frame, the leaf spring and the adjusting screw have been mounted to the viewfinder body.
Figure 12:
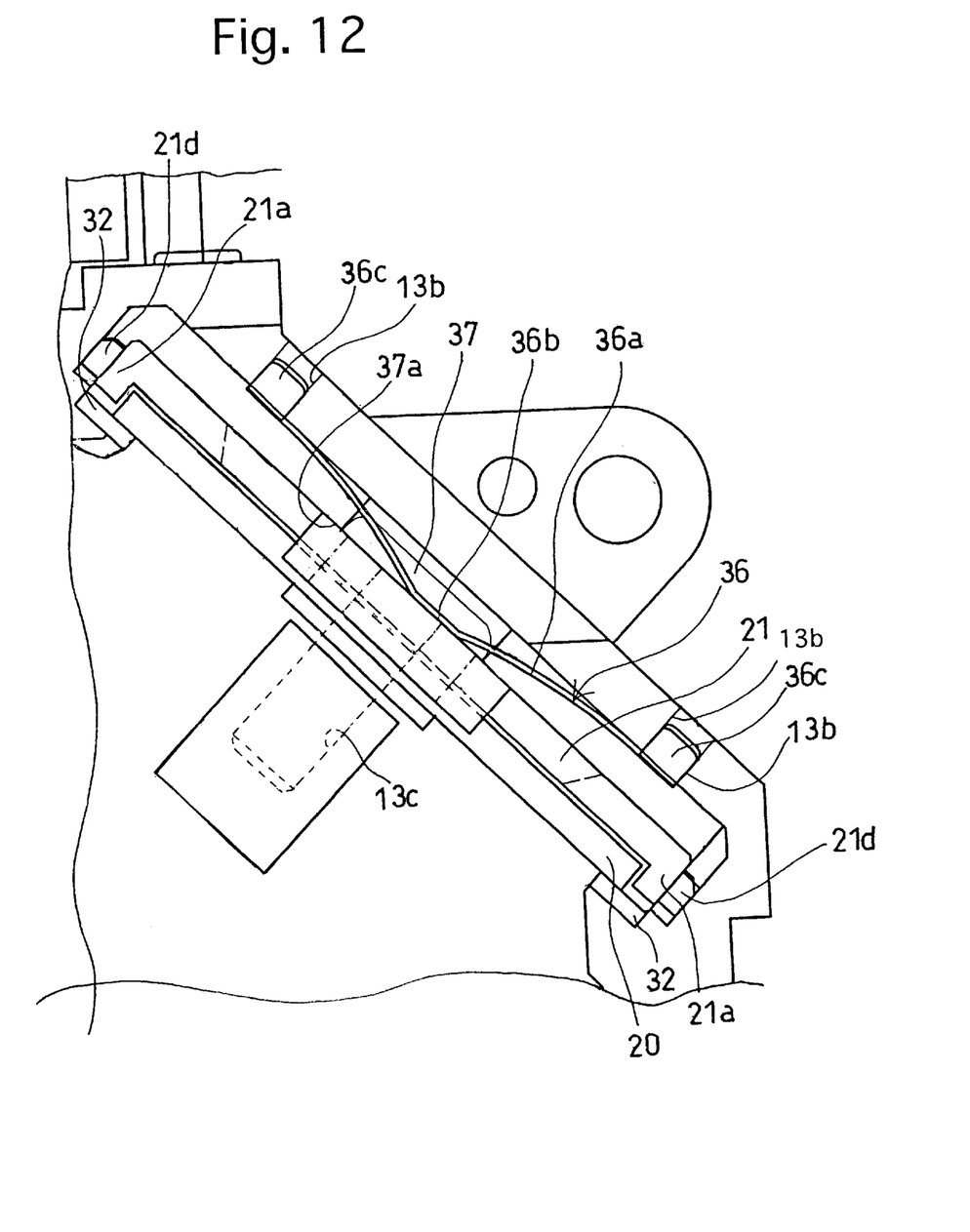
FIG. 12 is a plan view of a portion of the viewfinder body, viewed in the direction of an arrow XII shown in FIG. 4.

The mirror frame 21 to which the mirror 20 has been adhered is disposed in front of an upright wall 13a of the viewfinder body 13 with the reflection surface of the mirror 20 facing the inside of the viewfinder body 13 (see FIG. 11). The viewfinder body 13 is provided in the vicinity of right and left sides of the upright wall 13a with a pair of key grooves (recesses) 34 in which the pair of projections 21d of the mirror frame 21 are engaged, respectively (see FIGS. 5 and 10). In FIGS. 5 and 10 only one key groove 34 is shown. When the mirror frame 21 is mounted to the viewfinder body 13, the pair of projections 21d are inserted into the pair of key grooves 34, respectively. After the mirror frame 21 is mounted to the viewfinder body 13, the pair of projections 21d are positioned at the innermost points of the pair of key grooves 34, respectively, and are prevented from moving in a direction out of the pair of key grooves 34 to thereby prevent the mirror frame 21 from coming out of the viewfinder body 13. Namely, the mirror frame 21 is prevented from coming out of the viewfinder body 13 via the projections 21d and the key grooves 34. Note that the key grooves 34 have been omitted in FIG. 12 so that the projections 21d can be seen.

Figure 4:
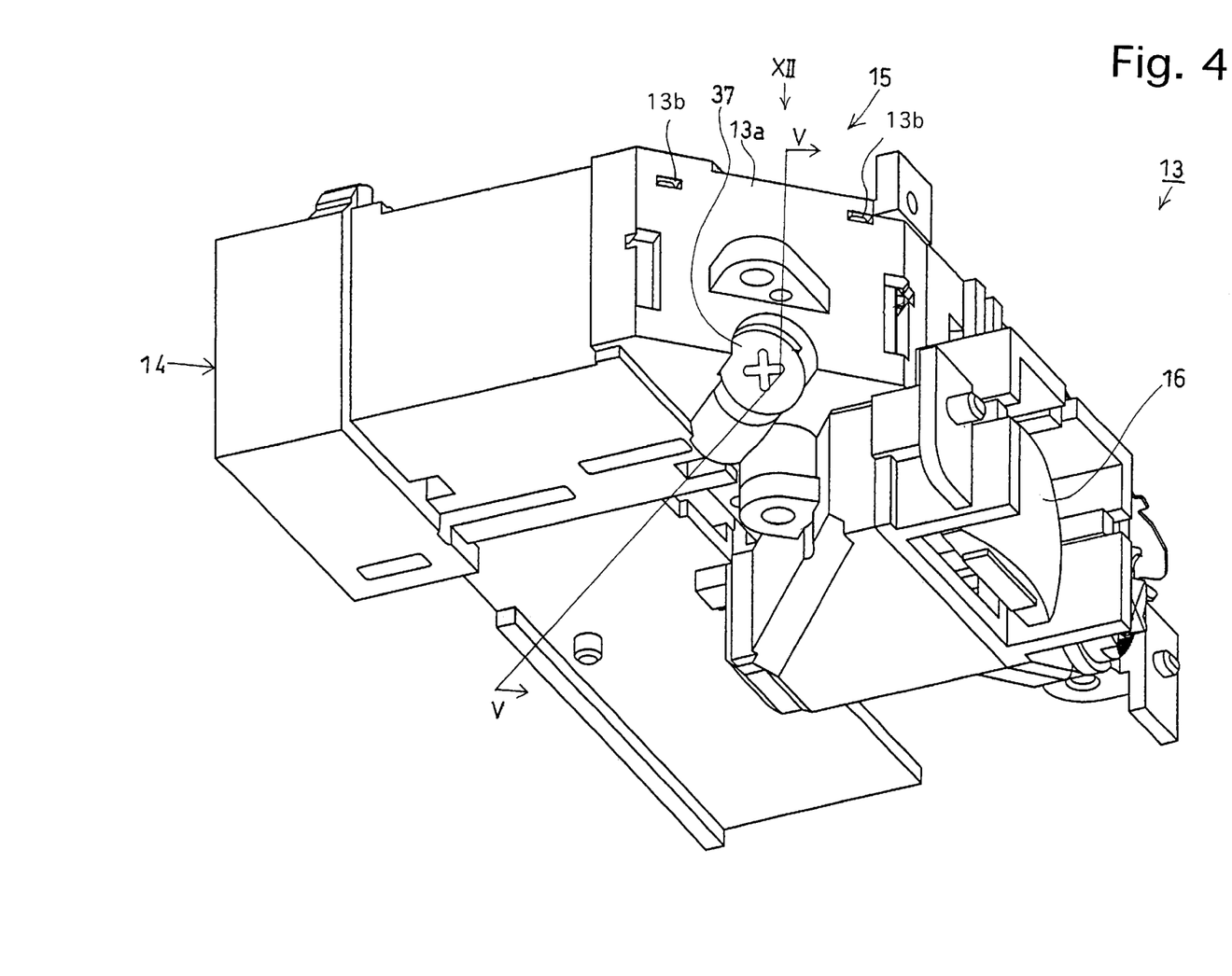
FIG. 4 is a perspective view of the viewfinder body shown in FIG. 3, viewed from another angle.
Figure 8:
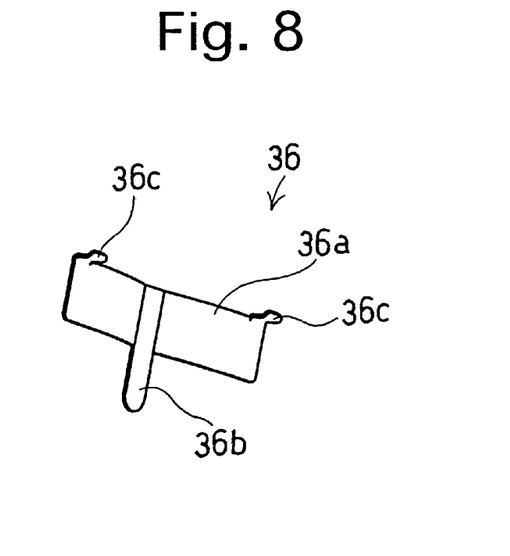
FIG. 8 is a perspective view of the leaf spring.
Figure 9:
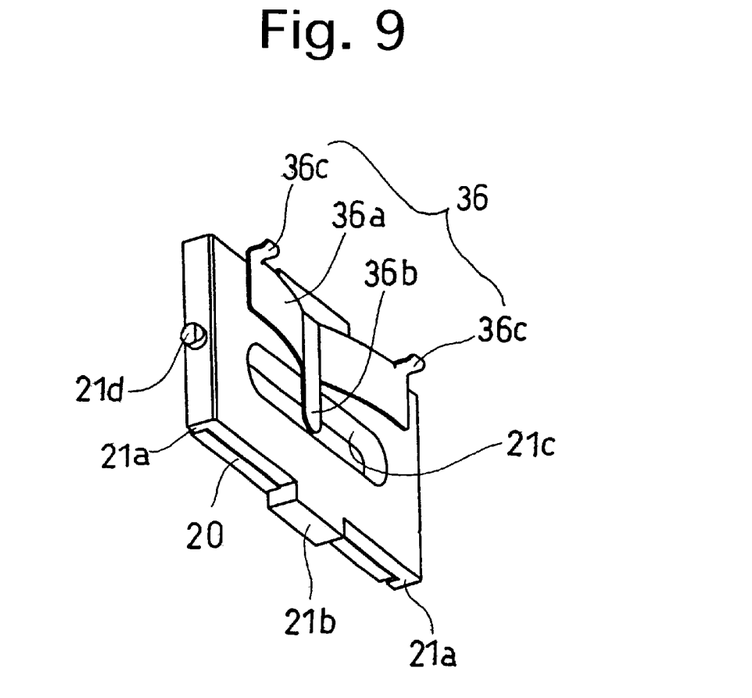
FIG. 9 is a perspective view of the mirror frame and the leaf spring, showing the positional relationship therebetween.

The viewfinder body 13 is provided in the vicinity of the pair of key grooves 34 with a pair of pivotal-point projections 32, respectively. Each pivotal-point projection 32 lies on a horizontal plane including the optical axis O of the viewfinder optical system 12. A leaf spring 36 is disposed between the mirror frame 21 and the upright wall 13a (see FIGS. 3 and 12). As shown in FIGS. 8 and 9, the leaf spring 36 is T shaped, and is provided with an angle spring portion 36a and a central leaf portion 36b. The central leaf portion 36b extends from the center of the angle spring portion 36a in a direction perpendicular to the longitudinal direction of the angle spring portion 36a. The leaf spring 36 is provided on opposite sides of the angle spring portion 36a with engaging projections 36c. The two engaging projections 36c are respectively engaged in two support holes 13b (see FIGS. 4 and 12) formed on the upright wall 13a, while the central leaf portion 36b comes in contact with the back of the mirror frame 21 (see FIG. 9). The angle spring portion 36a is positioned on one side (the upper side as viewed in FIG. 11) of an axis which connects the pair of pivotal-point projections 32.

The leaf spring 36 causes corresponding portions of the reflection surface of the mirror 20 to remain in contact with the pair of pivotal-point projections 32, and biases the mirror frame 21 so as to rotate about the axis of the pair of pivotal-point projections 32 in a direction to move an upper portion of the mirror frame 21, which faces the angle spring portion 36a, toward the inside of the viewfinder body 13. The position, the shape and the size of each pivotal-point projection 32 is determined so that each pivotal-point projection 32 contacts the portion of the reflection surface of the mirror 20 (which is positioned outside the effective area thereof) so that the mirror frame 21 can rotate about the axis connecting the pair of pivotal-point projections 32.

An adjusting screw 37 is screwed into a portion of the viewfinder body 13 which is positioned on another side (the lower side as viewed in FIG. 11 where the angle spring portion 36a is not positioned) of the axis connecting the pair of pivotal-point projections 32. An annular flat face 37a of the head of the adjusting screw 37, which is positioned on the thread side of the adjusting screw 37, contacts a lower end portion of the back face of the mirror frame 21. A female screw hole 13c formed on the viewfinder body 13 into which the adjusting screw 37 is screwed is shown in FIG. 5. The limit of rotation of the mirror frame 21, which is biased to rotate by the leaf spring 36 is defined by the adjusting screw 37 (see FIGS. 10 and 12). Turning the adjusting screw 37 causes the mirror frame 21 to rotate about the axis connecting the pair of pivotal-point projections 32 to thereby vary the angle of the mirror frame 21. Accordingly, a parallax which occurs between the photographing optical system 11 and the viewfinder optical system 12 is corrected by adjusting the angle of the mirror 20 via the adjusting screw 37. Furthermore, according to the above-described construction, wherein the annular flat face 37a of the adjusting screw 37 is employed to adjust the mirror frame 21, a small parallax correction mechanism can be achieved. The mirror frame 21, the leaf spring 36, the pair of pivotal-point projections 32, the adjusting screw 37, the annular flat face 37a, and the female screw hole 13c are fundamental elements of the parallax correcting mechanism according to the present invention.

As can be understood from the above descriptions, the mirror 20 rotates about the axis of the pair of pivotal-point projections 32 by turning the adjusting screw 37. Since the axis of rotation of the mirror 20 lies on the reflection surface thereof, the angle of the mirror 20 does not easily move out of adjustment with time even if the mirror 20 and/or the mirror frame 21 deforms with time.

In the above illustrated embodiment, the pair of projections 21d are formed on the mirror frame 21, while the pair of key grooves 34, in which the pair of projections 21d are engaged, are formed on the viewfinder body 13. However, the present invention is not limited solely to this particular embodiment. Namely, a pair of projections corresponding to the pair of projections 21d can be formed on the viewfinder body 13, while a pair of key grooves corresponding to the pair of key grooves 34 can be formed on the mirror frame 21. The shape of the leaf spring 36 can be any other shape as long as it functions the same.

The present invention can be applied to not only a camera such as the camera 10 having the above described structure, but also any other optical device in which a mirror that requires an angle adjustment is incorporated in an optical path.

As can be understood from the foregoing, according to the present invention, a simple mechanism for adjusting an angle of a mirror incorporated in an optical device, wherein the angle of the mirror does not easily move out of adjustment with time, is achieved. Furthermore, according to the present invention, a simple mechanism of a camera for correcting a parallax which occurs between the photographing optical system and the viewfinder optical system that are provided independent of each other in the camera, wherein the parallax adjustment does not easily move out of adjustment with time, is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A parallax correcting mechanism of a camera for correcting a parallax between a photographing optical system and a viewfinder optical system which are provided independent of each other within said camera, said parallax correcting mechanism comprising:

a mirror which serves as an element of said viewfinder optical system;

a mirror frame which supports said mirror;

a pair of pivotal-point projections formed on a viewfinder body to lie on a mirror rotational axis of said mirror, each of said pair of pivotal-point projections contacting a portion of a reflection surface of said mirror which is positioned outside an effective area of said reflection surface;

a pair of recesses formed on one of said mirror frame and said viewfinder body;

a pair of projections formed on the other of said mirror frame and said viewfinder body to be respectively engaged in said pair of recesses, said pair of projections and said pair of recesses being positioned on the opposite side of said reflection surface of said mirror with respect to said pair of pivotal-point projections;

a leaf spring for pressing said mirror frame against said pair of pivotal-point projections; and an adjusting screw which is screwed into said viewfinder body on one side of said mirror frame with respect to said mirror rotational axis;

wherein a flat face of a head of said adjusting screw, which is positioned on the thread side of said adjusting screw, contacts an end portion of said one side of said mirror frame.

2. The parallax correcting mechanism according to claim 1, wherein said leaf spring is positioned between said mirror frame and said viewfinder body.

3. The parallax correcting mechanism according to claim 1, wherein said viewfinder optical system comprises an erecting optical system, said mirror serving as an element of said erecting optical system.

4. The parallax correcting mechanism according to claim 1, wherein said mirror frame comprises a hole in which an adhesive is poured to adhere said mirror to said mirror frame.

5. The parallax correcting mechanism according to claim 1, wherein said viewfinder optical system is a real-image viewfinder optical system.

6. A mirror-angle adjusting mechanism for adjusting an angle of a mirror incorporated in an optical device, said mirror-angle adjusting mechanism comprising:

a mirror frame which supports said mirror;

a pair of pivotal-point projections formed on a body of said optical device to lie on a mirror rotational axis of said mirror, each of said pair of pivotal-point projections contacting a portion of a reflection surface of said mirror which is positioned outside an effective area of said reflection surface;

a pair of recesses formed on one of said mirror frame and said body;

a pair of projections formed on the other of said mirror frame and said body to be respectively engaged in said pair of recesses, said pair of projections and said pair of recesses being positioned on the opposite side of said reflection surface of said mirror with respect to said pair of pivotal-point projections;

a leaf spring for pressing said mirror frame against said pair of pivotal-point projections; and an adjusting screw which is screwed into said body on one side of said mirror frame with respect to said mirror rotational axis;

wherein a flat face of a head of said adjusting screw, which is positioned on the thread side of said adjusting screw, contacts an end portion of said one side of said mirror frame.

7. The mirror-angle adjusting mechanism according to claim 6, wherein said leaf spring is positioned between said mirror frame and said body.

8. The mirror-angle adjusting mechanism according to claim 6, wherein said mirror frame comprises a hole in which an adhesive is poured to adhere said mirror to said mirror frame.

* * * * *